(12) United States Patent
Smith et al.

(10) Patent No.: US 6,978,734 B1
(45) Date of Patent: Dec. 27, 2005

(54) ELECTRIC FISH BARRIER FOR WATER INTAKES AT VARYING DEPTHS

(75) Inventors: David V. Smith, Carpinteria, CA (US); Lee Roy Carstensen, Vancouver, WA (US)

(73) Assignee: Smith-Root, Inc., Vancouver, WA (US)

(*) Notice: Subject to any disclaimer, the term of this patent is extended or adjusted under 35 U.S.C. 154(b) by 0 days.

(21) Appl. No.: 10/677,399

(22) Filed: Oct. 1, 2003

(51) Int. Cl.[7] ............................................. A01K 61/00
(52) U.S. Cl. ....................................................... 119/220
(58) Field of Search ........................... 119/220; 405/81

(56) References Cited

U.S. PATENT DOCUMENTS

| | | | | |
|---|---|---|---|---|
| 1,292,246 A | | 1/1919 | Burkey | 119/220 |
| 1,515,547 A | * | 11/1924 | Burkey | 119/220 |
| 1,974,444 A | * | 9/1934 | Burkey | 119/220 |
| 2,778,140 A | * | 1/1957 | Applegate et al. | 43/17.1 |
| 2,991,421 A | * | 7/1961 | Volz | 327/465 |
| 4,197,423 A | | 4/1980 | Fusen | 174/107 |
| 4,825,810 A | | 5/1989 | Sharber | 43/17.1 X |
| 5,445,111 A | | 8/1995 | Smith | 119/220 |
| 5,551,377 A | * | 9/1996 | Sharber | 119/220 |
| 6,134,824 A | | 10/2000 | Gleeson | 43/17.1 |
| 6,357,390 B1 | * | 3/2002 | Maehata et al. | 119/220 |

* cited by examiner

Primary Examiner—Robert P. Swiatek
(74) Attorney, Agent, or Firm—Kenneth J. Hovet; Jeffrey F. Craft; Paul D. Chancellor (57) ABSTRACT

An electric fish barrier for deterring fish from entering a water intake in a reservoir or along a waterway has a set of conductive members at a first voltage potential and a second set of conductive members at a second voltage potential. The conductive members are disposed on support piles extending up from the bottom of the reservoir. Each conductive member extends vertically between a pre-determined range of depths from an upper depth to a lower depth, forming a contiguous voltage gradient between the two sets of conductive members. Fish are drawn to the attraction flow of water flowing into the intake. The two sets of conductive members are oriented such that the attraction flow passes through the contiguous voltage gradient, thereby deterring the fish from following the attraction flow into the water intake.

12 Claims, 7 Drawing Sheets

ELECTRIC FISH BARRIER FOR WATER INTAKES AT VARYING DEPTHS

RELATED APPLICATIONS

This application incorporates by reference U.S. patent application Ser. No. 10/677,400 to Smith et al., entitled ELECTRIC FISH BARRIER WITH SHAPED VOLTAGE GRADIENT, and filed concurrently with the present application.

BACKGROUND OF THE INVENTION

1. Field of the Invention

The present invention relates to electric fish barriers used to govern the motion of fish in water. More particularly, the present invention relates to an electric fish barrier for discouraging fish from entering water intakes disposed at varying depths within a body of water.

2. Description of Related Art

The protection and preservation of natural resources includes the management of fish and game. Fish move about lakes, rivers, streams and reservoirs for a variety of reasons, including migration, spawning, and searching for food. Water intakes divert water for drinking, irrigation, and industrial uses. The introduction of fish into intakes is generally regarded as an unwanted event, and, in some cases, is expressly prohibited by federal government mandates such as the "Endangered Species Act" and the EPA "Clean Water Act.". Many rivers have hydroelectric, fossil fuel and nuclear power plants with water intakes to the hydroelectric turbines and for cooling. It is desirable to keep the fish out of these intakes and away from dangerous conditions. Many large bodies of water are linked by inland waterways, including natural rivers and man made canals. Some of these bodies of water have diverse fish and wild life that are foreign to each other. Because migration across such natural divides can upset the ecological balance, government mandates often require that construction and use of such waterways incorporate a method or apparatus for controlling ecologically harmful migration through these waterways. As a consequence, all water diversions require governmental licenses and/or permits, and require periodic re-licensing. The water diversions must be upgraded to satisfy any changes in government regulations at the time of re-licensing. For these, and a variety of other economic, commercial, cultural and ecological reasons, it is often necessary to govern the migration and random motion of fish.

As the need for governing the movement and migration of fish has been recognized, means for achieving this goal have also been developed. Electric fish barriers, such as described in U.S. Pat. No. 4,750,451 to Smith, have become a common and useful means for governing the migration and travels of fish in lakes, locks, rivers, dams, fisheries and other restricted or controlled areas.

In electric fish barriers, an electrical irritation or shock is only felt by a fish when there is a voltage differential across the fish thereby driving an electrical current through a fish. Accordingly, the most significant factor in controlling the motion of fish is not the field strength, with respect to ground, where the fish is located, but the voltage gradient where the fish is located. Field voltage gradient is the rate of change in voltage of an electric field per linear measure. Although the instantaneous axis of the linear measurement can be in any direction, the maximum field gradient is measured across a unit length of a one dimensional line oriented perpendicular to the two dimensional surface representing an equipotential voltage plane. The instantaneous voltage differential across unit distance is thus the electric field gradient, or voltage gradient. The higher the voltage gradient, the greater the total voltage drop across a fish, and consequently, the greater the electrical current that will pass through a fish.

Because a gradient times a linear distance equals a voltage potential, it can be understood that the longer a fish, the greater the total voltage drop across the fish. Similarly, because resistance is inversely proportional to the cross sectional area of a resistor, and because a large fish typically has a proportionally larger cross sectional area, the larger the fish, the lower the resistance of the fish. The size of a fish, therefore, affects the electrical current flow through the fish for several reasons as illustrated above.

Although a maximum transfer of energy from water to a fish occurs when the fish's electrical conductivity matches the electrical conductivity of the surrounding water, because a fish has salts and electrolytes within its body necessary to sustain life, a fish's body is normally more conductive than fresh water. As a result, the fish's body acts as a "voltage divider" when swimming through fresh water, and the gradient of an electrical field in the body of a fish will typically be less than the voltage gradient in the same space filled by fresh water. That is, the voltage gradient is altered in a region proximate a fish in the zone of an electric fish barrier. Nevertheless, all other factors remaining equal, the voltage gradient in the body of a fish will be roughly proportional to the voltage gradient in the same region of fresh water when no fish is present. Accordingly, if the voltage gradient in a region of water is doubled, the voltage gradient across the fish (and the electrical current through the fish) will also double. The effectiveness of an electric fish barrier on a particular fish, therefore, depends on the voltage field gradient produced by the electric fish barrier.

If a voltage gradient in a region of water is too weak, the fish will not feel appreciable discomfort, and will travel undaunted by the electric fish barrier. An "annoying region" will cause a fish to turn around and travel the preferred route. Conversely, early experiments have demonstrated that if a moderately annoying region of the electric barrier is too narrow to allow a fish to turn around, and a rapidly swimming fish passes quickly through an "annoying" region and into a painful region, large fish have been observed to react so violently in their attempt to change direction that they have actually snapped their own spine. As a result of these observations, an ideal fish barrier will normally have a wide region with a moderately annoying voltage gradient, increasing at a rate that causes increasing discomfort to fish of various sizes and species, but allowing ample room for a fish experiencing discomfort to turn around before passing completely through the annoying region and into a painful or lethal region. The awareness of the field gradient should, therefore, not be a sudden discovery, but a gradually growing annoyance. Whether a fish barrier is effective, ineffective or harmful is thus a function of the shape of the boundary, the thickness and the intensity of a voltage gradient produced by an electric fish barrier.

The current passing through a fish depends on a variety of factors such as the conductivity of the water at both ends of the fish, the total resistance in a conductive path of water, and the size and species of a fish being repelled, etc. Typically, higher gradients are necessary to control the travel and migration of smaller fish, and lower gradients are effective for larger fish. The effectiveness of a particular strength gradient also depends on the species of fish, and whether the motion of the water reliably flows in a direction to orient the fish along the axis of the strongest gradient, which is perpendicular to the equipotential voltage plane. However, a voltage gradient of one hundred volts per meter has been observed to establish a good base-line voltage gradient for effectively and yet safely deterring average size fish from entering a prohibited area. It is understood that higher and lower voltage gradients may be appropriate according to a variety of factors.

Figure 1:
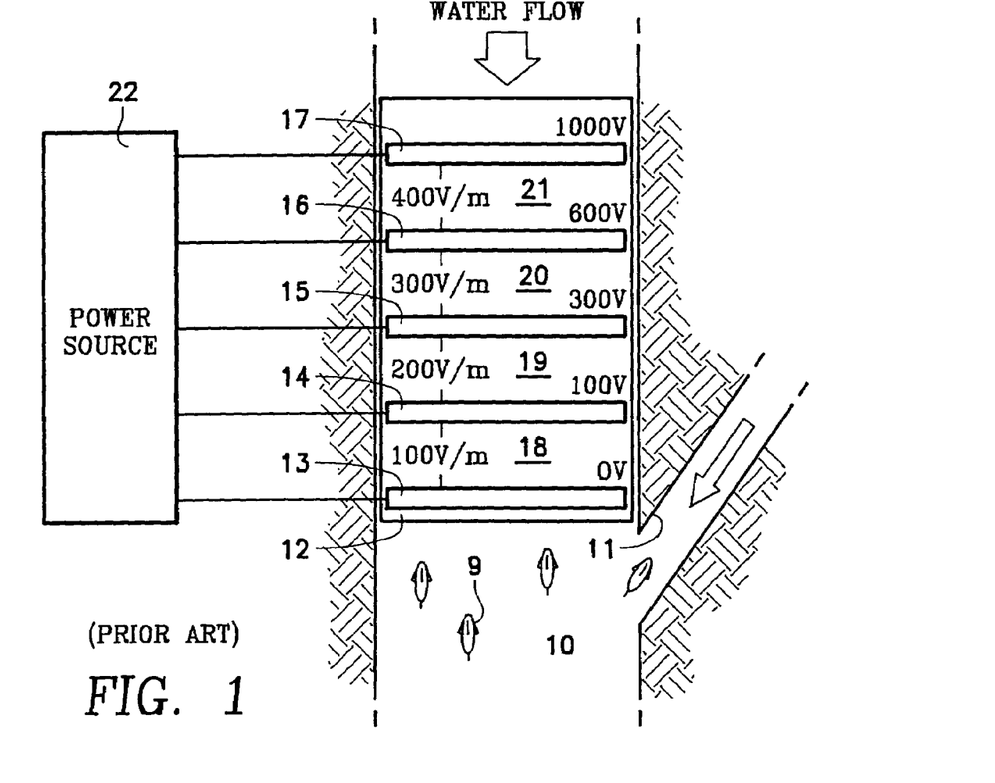
FIG. 1 is a top plan view of an electric fish barrier in a shallow stream according to the prior art.

FIG. 1 illustrates a multi-stage fish barrier known in the prior art for regulating the traffic of fish in shallow waterways. According to this example, fish 9 within a waterway 10 seek to migrate up river (against the water flow), and the electric barrier is configured to direct them to an alternative route 11. Five electrodes 13–17 rest on a substrate 12 within riverbed 10. The five electrodes 13–17 separate the stream or river into four separate voltage gradient regions 18–21. The electrodes 13–17 are advantageously formed from elongated members, such as cables or extruded bars. Although copper conducts electricity well, galvanic effects between copper and water can prematurely erode copper cables, requiring frequent replacement. Additionally, in water having a sulfur content, the ionized copper can form copper sulfate compounds in water, which can be poisonous to fish. For these reasons, a ferrous metal is usually preferred for forming the elongated members of the electrodes 13–17, such as steel cables, beams, or railroad track segments. The elongated members 13–17 are oriented perpendicular to the direction of water flow, which, in most confined river areas, also creates a geometrically parallel orientation among the elongated members.

The electrodes 13–17 of FIG. 1 are arranged at one meter intervals, and the voltage levels are controlled such that the relative voltage between two electrodes is continually increasing. Electrode 13 is at a zero or ground potential, and electrode 14 is at a one hundred volt peak potential, so that the peak differential between electrodes 13 and 14 is a one hundred volt differential. Electrode 15 is at a three hundred volts peak potential, so that the peak differential between electrodes 14 and 15 is a two hundred volt differential. Electrode 16 is at a six hundred volts peak potential, so that the peak differential between electrodes 15 and 16 is a three hundred volt differential. Electrode 17 is at a one thousand volts peak potential, so that the peak differential between electrodes 16 and 17 is a four hundred volt differential.

Since the distance between the electrodes 13–17 remains a constant one-meter, the voltage gradient in each region 18–21 is greater than the previous region. In region 18, the gradient is one hundred volts per meter. In region 19, the gradient is two hundred volts per meter. In region 20, the gradient is three hundred volts per meter.

In region 21, the gradient is four hundred volts per meter. As a fish advances into a progressively higher voltage gradient, the electrical current passing through that fish increases proportionally. Through the multi-stage barrier of FIG. 1, fish of a size or species that are not annoyed by a lower voltage gradient will be progressively exposed to higher voltage gradients, eventually forcing all migrating fish to turn around and select the alternative path 11 in their upstream travels. Although the multi-step barrier of FIG. 1 can be effective in a shallow stream, the incremental regulation of voltage gradients is not reliably formed by single-step or multi-step designs of the prior art in deeper water applications.

Figure 2:
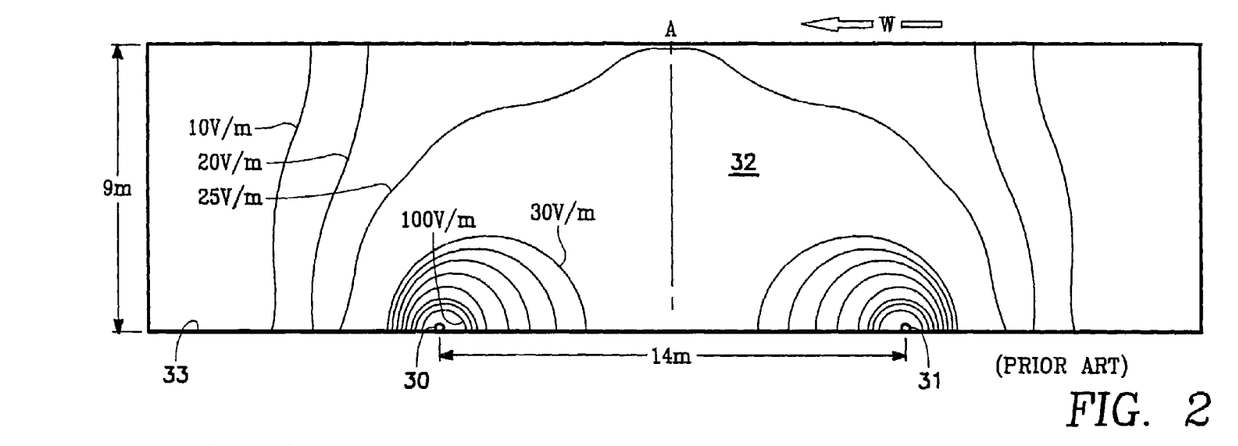
FIG. 2 is a cross-sectional side elevational view of equi-voltage-gradient lines formed by a prior art fish barrier having two bottom electrodes in a nine-meter deep river.

FIG. 2 is a prior art cross sectional view of a stream or river nine meters deep, illustrating the equi-gradient field lines of an electric field produced by two elongated members 30, 31 on a riverbed. The direction of river flow is along the w-axis. The elongated members 30, 31 are separated by fourteen meters in the direction of river flow, and disposed at the bottom of a river 32, perpendicular to the direction of flow. The conductivity of the river water is 500$\mu$ Siemens. A one kilovolt differential is generated between the two elongated members 30, 31.

As discussed above, the basic operational parameter of an electric fish barrier is the voltage gradient of an electric field, and a gradient of 100 volts per meter is a common benchmark for an operational system. If the field gradient between the two conductors 30, 31 were completely linear, one thousand volts over a fourteen meter range would produce a continuous gradient of seventy-one volts per meter. As the field gradient patterns of FIG. 2 indicate, however, the field gradient is not uniform between the two conductors 30, 31. A field gradient of sufficient strength must extend all the way to the surface to prevent passage of fish past the barrier. Because fish can travel on the surface where the gradient is weakest, the strongest gradient value to extend all the way to the surface is an important value for profiling the efficacy of a fish barrier. The strongest voltage gradient extending to the river surface in FIG. 2 was measured at 25 volts per meter. On the bottom of the riverbed, near the conductive elongated members 30, 31 viewed end-wise, the higher field gradients more closely resemble concentric cylinders formed around the respective elongated conductive members 30, 31. As one approaches the conductive members 30, 31, the path leading to a conductive member 30, 31 is distinguished by a voltage potential that changes rapidly over distance, which equates to a high voltage gradient.

Because effective blocking of fish from migrating up or downstream would require a minimum gradient of 100 volts per meter everywhere in a cross-sectional plane to the direction of flow of the river, calculations were performed normalizing the surface gradient at one hundred volts per meter according to the prior art design of FIG. 2. At this normalized value, the calculations disclose that a peak voltage difference of 4.032 kilovolts between the elongated members 30, 31 would be required to produce a surface gradient of one hundred volts per meter.

At the level of 4.032 kilovolts potential between the elongated members 30, 31, the electrical current produced by the normalized electric field pattern in a river nine meters deep and one meter wide would be 52.5 amps at a conductivity of 500$\mu$ Siemens.

Although fish barriers can be formed from any kind of signal, past discoveries have indicated that A.C. barriers can have harmful physiological effects on fish, and that steady state D.C. barriers can be counter-productive in preventing downriver migration, progressively tetanizing a fish as it enters the steady state D.C. electric field, thereby diminishing its ability to resist the flow of water, and inexorably carrying the fish downriver. D.C. pulse trains ranging from two to ten pulses per second, with pulse width ranging from 400 microseconds to 40 milliseconds have been found to be safe and effective in many applications. When a D.C. pulse at a 2% duty cycle (ratio of on-time to the total time period of a pulse) is incorporated at the voltage of 4.032 kilovolts in the prior art design of FIG. 2, the power consumption is 4,234 kilowatts for a river nine meters deep and 1 meter wide at 500$\mu$ Siemens. The 4.032 kilovolt level and the 2% duty cycle would remain unchanged for any width river, provided the elongated members 30, 31 extend across the entire riverbed. The above values for electrical current and power can be adjusted linearly for any width river. For example, a ten meter wide river would require a peak current of 525 amps at a power consumption of 42.34 kilowatts.

An additional problem with previous technology is that the most intense voltage gradient is proximate the floor of the river, reservoir or river. Many reservoirs, however, are quite deep, and water intakes in dams and irrigations reservoirs can be located significant distances from the floor of a reservoir. As noted above, the gradient diminishes the further one travels from the floor of the river or reservoir. In a reservoir wherein a water inlet is thirty or forty feet above the floor, extending a sufficiently strong voltage gradient from the floor of the reservoir to the front of the water inlet could consume enormous amounts of energy, and could potentially electrify the entire reservoir to dangerous levels.

There is, therefore, a need for an electric fish barrier that can form an effective voltage gradient in front of a water inlet in a reservoir. There is further a need for an electric fish barrier that can form an effective voltage gradient at a distance from the bottom of a reservoir without using enormous amounts of energy. There is further a need for an electric fish barrier that can focus a voltage gradient in front of a water inlet in a reservoir without unduly extending a strong voltage gradient to other regions of a reservoir.

SUMMARY OF THE INVENTION

The present invention relates generally to an apparatus for shaping an electric field in water in order to effectively control the motion of fish at a variety of depths and spatial areas. The invention also relates to an electric fish barrier that can form an effective voltage gradient in front of a water inlet in a reservoir at a distance from the bottom of a reservoir without using enormous amounts of energy or unduly extending a strong voltage gradient to other regions of a reservoir.

An electric fish barrier is provided for use in a reservoir. A water intake disposed within the reservoir diverts water from the reservoir to a new location. An electrical source generates a voltage potential between a first terminal and a second terminal. A first plurality of electrode structures respectively comprise a first plurality of conductive members disposed in the reservoir of water.

The first plurality of conductive members are in electrical continuity with the first terminal of the electrical source. A second plurality of electrode structures respectively comprise a second plurality of conductive members disposed in the reservoir. The second plurality of conductive members are in electrical continuity with the second terminal of the electrical source. A gradient is formed within the reservoir between the first plurality of conductive members and the second plurality of conductive members. The voltage gradient includes a minimum contiguous gradient throughout an effective barrier zone.

An attraction flow of water sensible to a fish and oriented according to a flow axis, moves toward the water intake. A portion of the attraction flow of water passes through the effective barrier zone. The effective gradient comprises an equipotential voltage plane that is substantially perpendicular to the flow axis.

According to an embodiment, the first plurality of electrode structures are oriented along a first line and the second plurality of electrodes are oriented along a second line that is substantially parallel the first straight line. According to an alternative embodiment, the first plurality of electrode structures are oriented along a first curved line, and the second plurality of electrodes are oriented along a second curved line which may conform in shape to the first curved line.

Each electrode structure includes a conductive member exposed to the water within the reservoir for generating a voltage gradient, and a pile for structurally supporting the conductive member at a pre-determined depth. According to one embodiment, the conductive member is part of the actual pile. According to an alternative embodiment, the conductive member is supported by the pile, but does not contribute to the structural integrity and strength of the pile. The term electrode member, as used herein, can therefore include conductive and non-conductive elements. The plurality of piles have a first end extending above the water level of the reservoir, and a second end at the bottom of the reservoir. The second end is preferably secured within a foundation.

According to the embodiment wherein an electrically conductive member is not part of a pile, each electrically conductive member is formed from an elongated hollow metal cylinder girded about a respective pile. The electrically conductive member is insulated from any conductive structure within the pile.

According to the embodiment wherein the conductive member is part of the pile, a metal cylinder filled with concrete has an exposed region exposing the metal cylinder to the reservoir water. A lower insulator insulates a region of the metal cylinder below the exposed region, and an upper cylinder insulates a region of the metal cylinder above the exposed region. The base of the pile rests on an insulating foundation.

If the reservoir is formed by a dam, the electric fish barrier will advantageously comprise a structural brace secured to the dam. Each pile is then secured to the structural brace.

An improved electric fish barrier for deterring fish from entering a water intake in a reservoir comprises a first plurality of conductive members at a first voltage potential and a second plurality of conductive members at a second voltage potential. Water flowing into the intake forms an attraction flow for fish. A contiguous effective voltage gradient is formed by the respective conductive members along an axis of the attraction flow. The conductive members have an exposed surface region in contact with the water of the reservoir. A portion of the attraction flow passes through the contiguous effective voltage gradient. The reservoir has a bottom, and the water within the reservoir has a surface. In embodiments limiting the depth of the effective voltage gradient, the exposed surface region of a conductive member does not extend to the bottom of the reservoir. According to one embodiment, an insulating member insulates a lower portion of a conductive member. According to another embodiment, a conductive member is supported such that a bottom edge of a conductive member is suspended a pre-determined distance from the bottom of the reservoir.

BRIEF DESCRIPTION OF THE DRAWINGS

The novel features which are considered characteristic for the invention are set forth in the detailed description and the appended claims. The invention itself, however, both as to its construction and its method of operation, together with additional objects and advantages thereof, will be best understood from the following description of the specific embodiments when read and understood in connection with the accompanying drawings.

DESCRIPTION OF THE PREFERRED EMBODIMENT

Figure 3:
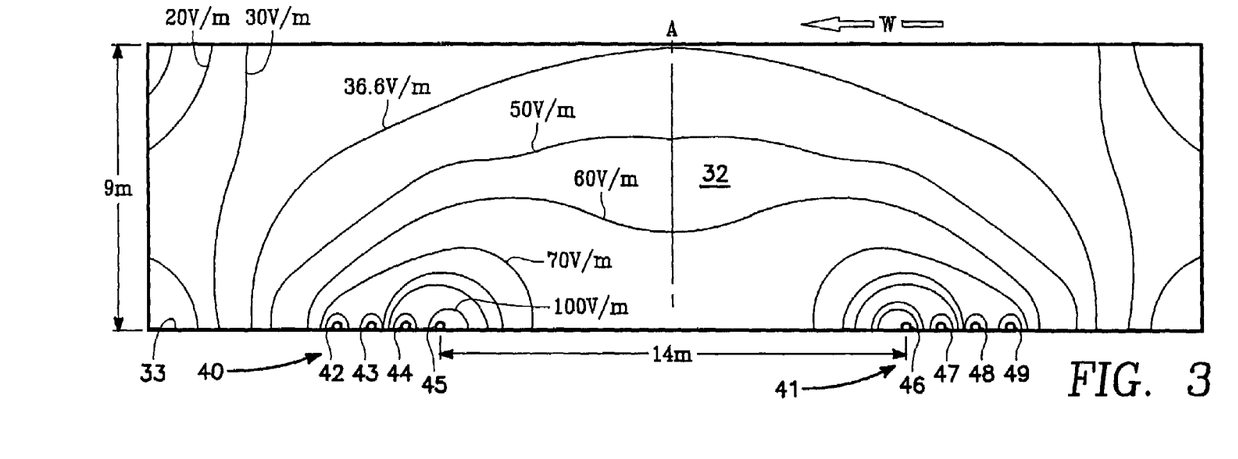
FIG. 3 is a cross-sectional side elevational view of equi-voltage-gradient lines formed in a nine meter deep river by a multi-electrode fish barrier.
Figure 4:
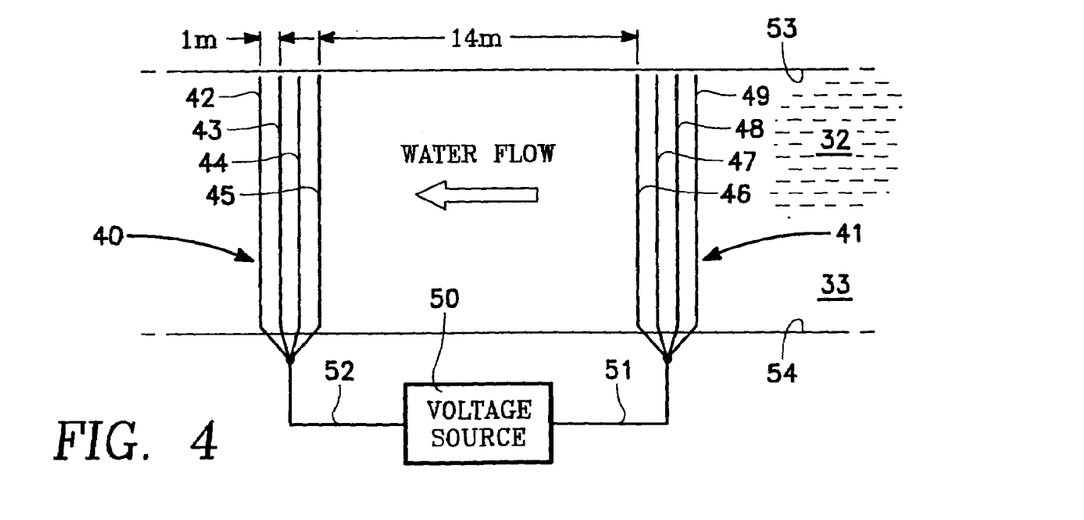
FIG. 4 is a top plan view of the river of FIG. 3, showing the distribution of electrodes extending across the riverbed.

FIGS. 3 and 4 illustrate an embodiment of the invention for use in conjunction with a body of water such as a river, stream, or reservoir. As used herein, the term "river" is used generically, and can refer to any moving body of water, including, but not limited to, a river, stream, or a moving area of water within a reservoir leading to a water intake. Although applications herein are directed to moving water having an attraction flow, those skilled in the art will recognize that the principles described herein can be readily applied for use in conjunction with a stationary body of water. A first array 40 of multiple electrodes 42, 43, 44, 45 are electrically connected at a first common voltage and are spatially distributed over a select area in order to expand a range of a voltage field. A second array 41 of multiple electrodes 46, 47, 48 and 49 are electrically connected at a second common voltage and are also spatially distributed over a select area in order to expand a range of a voltage field. The area between the separate voltage potentials defines a voltage gradient. The number and geometric arrangement of the multiple electrodes, therefore, affects the voltage gradient in the stream or river 32.

As shown in FIG. 4, a single stage electric fish barrier has two terminals, 51 and 52 that are electrically connected to a voltage source 50. Terminal 52 is electrically connected to above referenced four electrodes 42–45, and terminal 51 is electrically connected to above referenced four electrodes 46–49. Although FIGS. 3 and 4 are directed to a single-stage fish barrier, those skilled in the art will readily appreciate that the principles illustrated therein can be applied to multi-stage fish barriers as well. In order to compare the effectiveness of the present invention over the prior art, the river parameters of FIGS. 3 and 4 are identical to FIG. 2. Accordingly, the river/stream 32 of FIG. 3 is also a nine meter deep river also having a direction of flow along the w-axis. The conductivity of the river water remains at $500\mu$ Siemens. The principal will work in other conductivities as well. In water having lower conductivity, there is a greater mismatch between the electrical conductivity of the water and the conductivity of the fish's body. As a result, fish barriers in water of low conductivity typically require higher voltages, but ultimately consume less power. In contrast, as the conductivity of water rises, the operational voltage of an electric fish barrier can be lowered, but the total power consumption will rise. At a conductivity of $55,000\mu$ Siemens, the operation of a fish barrier within sea water would require so much power that such applications are generally not considered practical.

A first voltage potential is introduced to the river 32 by four elongated conductive electrodes 42, 43, 44 and 45 oriented in a parallel orientation and resting on the riverbed 33, spaced at one meter intervals. Each of the elongated electrodes 42, 43, 44 and 45 in the first set 40 has a first end proximate the first bank 54 of the river 32, and a second end proximate the second bank 53 of the river 32. The first ends of the electrodes 42, 43, 44 and 45 terminate at a common electrical connection with terminal 52 of a voltage source 50, thereby maintaining a common electrical potential.

A second voltage potential is introduced to the river 32 by four elongated conductive electrodes 46, 47, 48 and 49 oriented in a parallel orientation and resting on the riverbed 33, and also spaced at one meter intervals. Each of the elongated electrodes 46, 47, 48 and 49 has a first end proximate the first bank 54 of the river 32, and a second end proximate the second bank 53 of the river 32. The first ends of the electrodes 46, 47, 48 and 49 terminate at a common electrical connection with terminal 51 of a voltage source 50, thereby maintaining a common electrical potential.

The spacing between electrodes at a common potential is exemplary, and spacing does not have to be uniform, nor at one meter intervals. For example, embodiments are envisioned wherein the spaces between a first 46 and second 47 electrode is one meter, the space between the second 47 and third 48 electrode is two meters, and the space between the third 48 and fourth 49 electrode is three meters. Accordingly, the uniform spacing of like-potential electrodes, as illustrated in FIGS. 3 and 4, is not essential to the function or use of the claimed invention.

The contour of a riverbed is a two dimensional surface, which, apart from the sides that slope up to the bank, is often substantially planar in contour. In any event, the electrodes 42, 43, 44, 45 and 46, 47, 48, and 49 follow the contour of the riverbed. These limitations are also exemplary. Non-planar geometric orientations of electrically connected electrodes are envisioned as within the scope of the present invention.

To compare an embodiment of the invention against the prior art, the separation between electrode 45 of the first electrode array 40, and electrode 46 of the second electrode array 41 was also fixed at 14 meters. These particular electrodes 45, 46 were selected since they were the closest together of the oppositely charged electrodes. The river is the same river at the same depth and having the same conductivity as FIG. 2 of the prior art, thereby allowing a valid comparison. FIG. 3 illustrates equipotential voltage gradient lines. The gradient values shown in FIG. 3 were produced by a one kilovolt differential, again using a D.C. rectangular pulse at a 2% duty cycle, identical to the signal generated for use in conjunction with FIG. 2.

As illustrated by FIG. 3, the effective barrier potential generated using multiple parallel electrodes is 36.6 volts per meter, which is the strongest voltage gradient to extend all the way to the surface of the river.

To further measure the invention against the prior art, the surface gradient of the river was also normalized at a voltage gradient of 100 volts per meter according to the system of FIGS. 3 and 4. Calculations disclose that a peak voltage difference of 2.755 kilovolts would be required between terminals 51 and 52 to produce a surface gradient of one hundred volts per meter. This figure compares with 4.032 kilovolts in prior art design (FIG. 2), thereby requiring only 68 percent of the voltage required in prior art designs.

At a pulsed DC of 2% duty cycle and a 2.755 kilovolt potential between terminals 51 and 52, the electrical current produced by the normalized electric field pattern in a river nine meters deep and one meter wide according to the design of the present invention would be 50.78 amps. This design results in a power consumption of 2.798 kilowatts for a river one meter wide, only two thirds the power consumption of the prior art design of FIG. 2 for the same river width. Again, the voltage value of 2.755 kilovolts and the 2% duty cycle would remain unchanged for any width river, provided the terminals 51, 52 extend across the entire riverbed, and the above values for electrical current and power can be adjusted linearly for any width river. For example, a ten meter wide river would require a peak current of 507.8 amps at a power consumption of 27.98 kilowatts.

Figure 5:
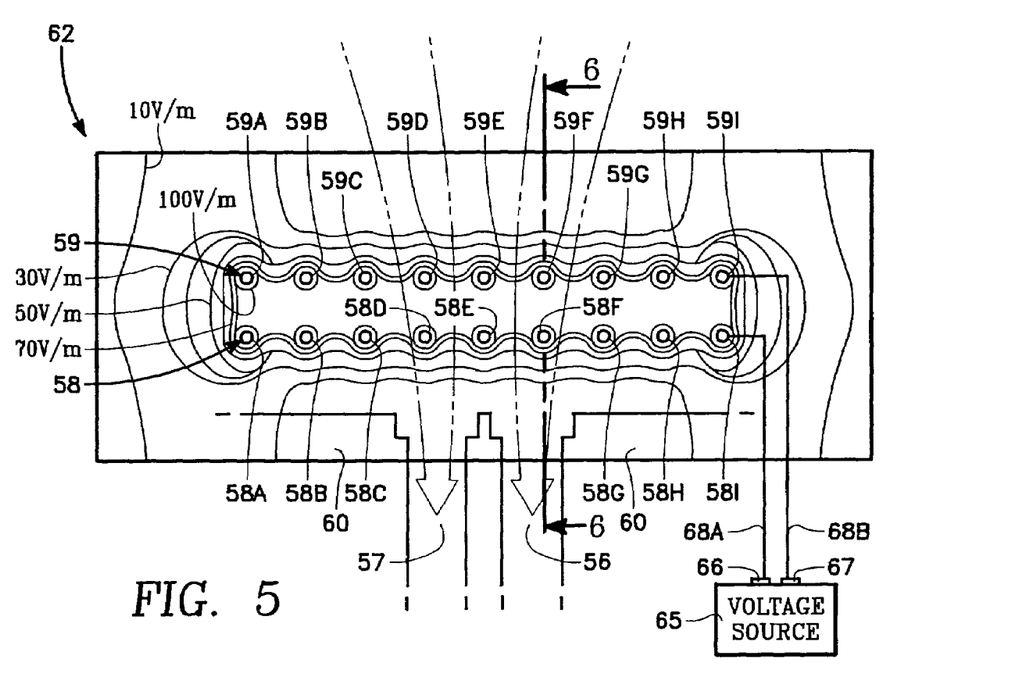
FIG. 5 is a top plan view of a dam and reservoir taken along line 6—6, showing equivoltage-gradient lines formed proximate the entrance of water intakes by two electrode arrays, each electrode array containing multiple equipotential electrodes according to the present invention.
Figure 6:
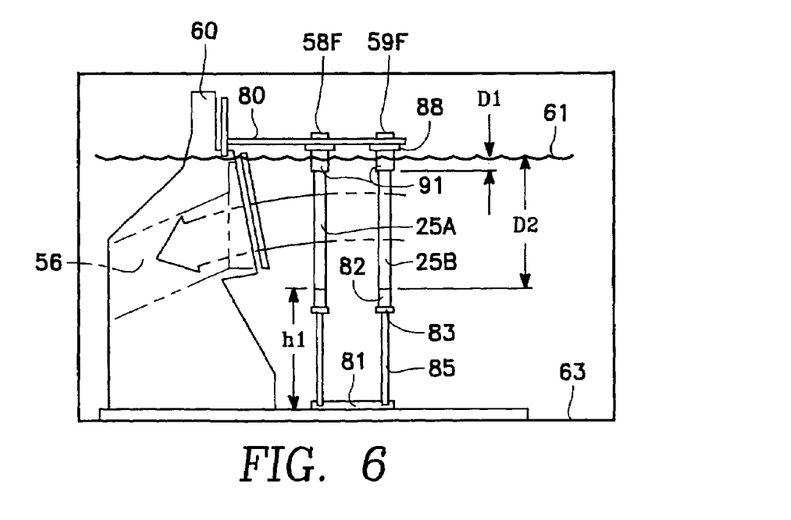
FIG. 6 is a cross-sectional side elevational view of the dam and reservoir of FIG. 5.

FIGS. 5 and 6 are directed to a dam 60 and dam reservoir with a single stage fish barrier 62 secured to the reservoir floor 63 and powered by a voltage source 65 which generates a voltage potential between terminal 66 and terminal 67. FIG. 5 is a top view of the dam and fish barrier, and FIG. 6 is a side view according to the perspective illustrated in FIG. 5. In the center of the dam are water intakes 56, 57. Those skilled in the art will recognize that a channel acting as a "water intake" or inlet to a particular destination is a "water outlet" from the water source. As used within in the specification and claims, the term "inlet" and "intake" are not intended to limit a direction of water flow, or imply that water is flowing through a channel into the reservoir. Rather, the terms "water intake" and "inlet" simply denote the functionality of the channel, irrespective of the direction of water flow. Similarly, the following description includes references and figures depicting "dams" and "reservoirs." These depictions are offered as exemplary structures and environments having water intakes. Water intakes are utilized in a variety of applications, including, but not limited to intakes that draw fresh water from lakes or rivers for water treatment plants that provide fresh water for consumption, or canals and water ways that channel cooling water to power plants. The principles are therefore applicable to any water intake within a body of water, and not limited to applications of dams and large dam reservoirs depicted within the figures.

The passage of water into the intakes 56, 57 creates a flow of water indicated by arrows entering the water intakes 56 and 57. Fish often govern their travel and migration by orienting themselves along the axis of a flow of water. When water flow is strong enough to be sensed by a fish, the water movement forms an "attraction flow." To deter fish from swimming into the water intakes 56, 57 and through the hydroelectric turbines, a single stage fish barrier 62 is positioned in front of the water intakes. The fish barrier functions to direct fish out of the attraction flow and away from the water intakes, effectively functioning as an "underwater electric fence."

The electric fish barrier 62 includes a first array 58 having nine separate electrode structures 58A–58I. As used herein, the term "electrode structure" includes both the conductive member and a support member such as a compressive pile, which may include non-conductive elements. A conductive member of an electrode structure can have a region exposed to water, and a region that, though conductive, is not directly exposed to water. Accordingly, the term "field effective segment" refers to the conductive portion of an electrode structure that is exposed to the water and therefore generating the field that repels fish. A field effective segment may therefore be co-extensive with a conductive member, or may be limited to an exposed region of a conductive member that is insulated above and below the field effective segment.

The field intensities of FIG. 5 were achieved by placing the nine electrode structures 58A,–58I within the first array 58 of electrodes at roughly three meter intervals from each other, and are in electrical continuity with one another, and with terminal 66 via conductive cable 68A.

A second array 59 of nine electrode structures 59A–59I were also spaced at three meter intervals and are in electrical continuity with one another and with terminal 67 of a voltage source 65 via conductive cable 68B. The exact number of electrode structures in each array, and the spacing of electrodes described herein is exemplary. Within different environments, electrode structures are arranged to create an effective contiguous voltage gradient that repels select fish within that environment without undue harm or injury to the fish. Embodiments are also envisioned wherein the separation distances between electrode structures within an array is not uniform throughout the array, but varies according to the position of an electrode in the array.

The direction of water flow is indicated by the dotted arrows extending between the electrodes and into the water inlets 56, 57. The surfaces defined by the complementary arrays 58, 59 are advantageously parallel to other. In applications wherein electrode arrays are oriented along a curved line, the first and second electrode arrays 58, 59 may be formed around substantially concentric curves. The planes defined by the electrode arrays 58, 59 are separated by approximately six meters, which creates a sufficient distance for fish to turn around as a voltage gradient becomes increasingly uncomfortable. The separation distance depends on a variety of factors, such as the size and specie of fish being regulated, and the velocity of water flow. Accordingly, greater or lesser separation distances are envisioned. Accordingly, a six meter distance is exemplary, and is not intended to limit greater or lesser distances in the design and use of such electric fish barriers.

When the voltage source 65 is energized, a voltage gradient will form between the two electrode arrays 58, 59. By orienting each of the electrode arrays in parallel lines that are equidistant from each other and at both ends, and perpendicular to the direction of water flow, as illustrated in FIG. 5, the voltage gradient formed between the first and second electrode arrays 58, 59 is maximized along the same axis as the flow of water. Fish swimming in the direction of water flow will, therefore, experience the greatest voltage gradient from head to tail, thereby maximizing the deterrent effect toward those fish that are swimming toward the water intakes 56, 57.

By orienting complementary electrode arrays 58, 59 in orientations that are substantially perpendicular to the direction of water flow, as shown in FIG. 5, the voltage gradient formed between the first and second electrode arrays 58, 59 will be maximized along the same axis as the flow of water. As discussed above, the preferred direction of travel for fish is in the direction of water flow. Accordingly, by orienting the geometry of each electrode array perpendicular to the flow of water, the deterrent effect of the fish barrier is maximized.

In application, the size, shape and other specific details of a fish barrier are governed by the specifics of the reservoir. One common goal of a fish barrier is to deter fish from entering a certain location. Another common goal is to re-route the fish to an alternative location. To deter fish from entering a water intake, the electric fish barrier should at least form an effective voltage gradient extending horizontally and vertically beyond the sensible limits of the attraction flow moving toward the intake. If a fish barrier is very near a water intake, this may require that the geometric outline of the effective voltage gradient extend simply to the horizontal and vertical limits of the water intake. If a fish barrier is farther away from a water intake, the geometric outline of the effective voltage gradient may have to be curved, or be substantially larger than the horizontal and vertical limits of the water intake.

In applications involving dam reservoirs, fish ladders or other alternative paths are generally available by which fish can transit up and down river while circumventing the water intake to a hydroelectric turbine. Because of this, a fish barrier may only need to re-route a fish into the attraction flow of the alternative route. Once a fish is in a proper attraction flow, they are not likely to deviate from it. Accordingly, the specific details of a fish barrier of FIGS. 5 and 6, including size, shape, position relative to a water intake, spacing of electrodes, and number of electrodes are exemplary, and should not be construed as limiting alternative embodiments that are envisioned within the scope of the invention as set forth in the appended claims.

If a path can be navigated through the barrier at voltage gradients below the minimum threshold causing discomfort to a fish, a fish will navigate away from the higher voltage gradients, and will be naturally forced into those channels that minimize discomfort. The fish will thereby navigate the passage through such a fish barrier. In FIG. 5, higher voltage gradients such as one hundred volts per meter are visible proximate individual electrode structures 58A–I, but do not form a contiguous gradient across a region coextensive with the plurality of electrode structures 58A–I, 59A–I that form the electric fish barrier. These higher noncontiguous gradients do not contribute significantly to the effectiveness of the barrier. Therefore, to form an effective fish barrier according to the design of FIG. 5, a minimum voltage gradient should be contiguous around the entire barrier. Within FIG. 5, the highest voltage gradient forming a contiguous barrier is in the approximate range of sixty to seventy volts. Depending on the conductivity of the water, the exemplary contiguous 60–70 volt/meter gradient of FIG. 5 can be effective for fish over one third meter in length. This value is exemplary, however, and the required voltage gradients in various applications can differ according to a variety of factors, including the size and species of fish, and electrical conductivity of the surrounding water. The equi-gradient lines of FIG. 5 is predicated on a supply voltage of 500 Volts between terminals 66 and 67, and a water conductivity of 500 micro Siemens.

FIG. 6 is a side view of fish barrier 62 which is an effective distance from dam 60. Electrode structures 58F and 59F include respective piles 85 extending from the reservoir bottom 63 to the surface 61. An elongated conductive member 25A,B extends vertically along a portion of each pile, extending from an upper depth to a lower depth. As discussed in the various embodiments, a conductive member may be a separate conductive sheath that is supported by the pile, or, may be formed from an exposed portion of an electrically conductive structural member of the pile itself. The exposed portion acts as a "field effective member" transmitting an effective voltage gradient into the water. The unexposed portion acts as a conductor of electrical current, but does not extend an effective voltage gradient into the water. Although the illustrations of FIGS. 6, 11 and 12 visually depict a conductive member supported by, and separate from the actual pile, as discussed in conjunction with FIGS. 7–9, this depiction is not intended to limit the application of these figures to any one embodiment. The principals of FIGS. 6, 11 and 12 can apply equally to embodiments wherein a conductive member is an exposed portion of structural conductor such as a pipe forming the outer layer of the actual pile.

To deter fish from entering the flow of water entering water intake 56, the conductive members 25A,B are preferably sized and positioned to extend the effective voltage gradient beyond the sensible limits of the attraction flow of water entering the intake 56. As the distance from a water inlet increases, the cross sectional area of the attraction flow typically widens. According to the embodiment of FIG. 6, the upper and lower vertical limits D1 and D2 of the conductive members 25A,B extend beyond the vertical limits of the water intake 56. The bottom edges of the conductive elongated members 25A,B are disposed a distance h1 above the bottom of the reservoir.

Figure 11:
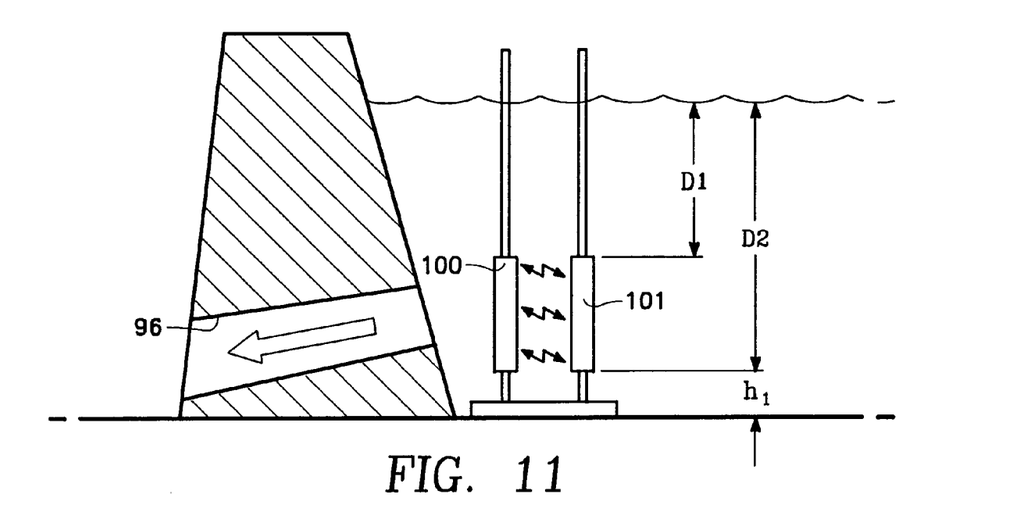
FIG. 11 is a schematic side view of an electric fish barrier with conductive members disposed in front of a deep intake.
Figure 12:
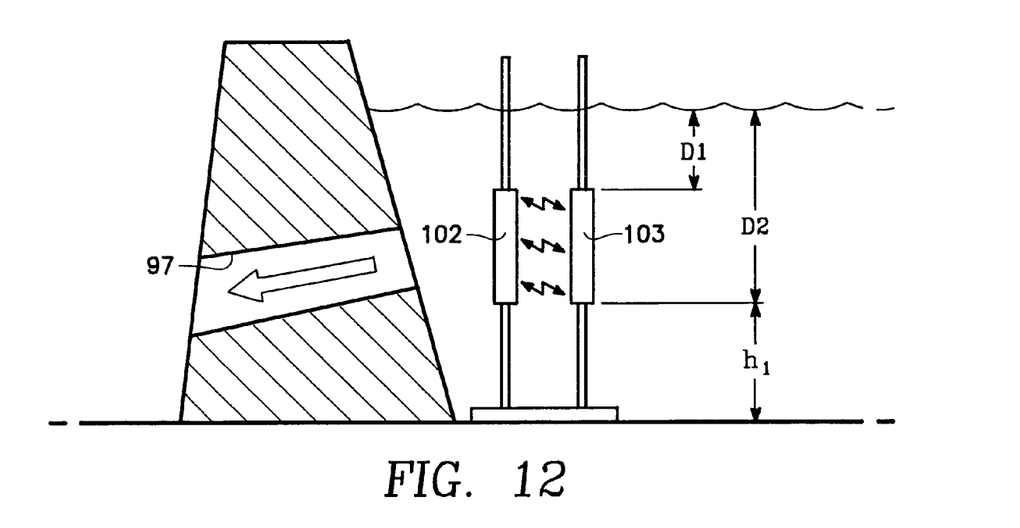
FIG. 12 is a schematic side view of an electric fish barrier with conductive members disposed in front of a medium depth intake.

The vertical limits of a conductive portion of an electrode structure vary according to the parameters of a particular reservoir. To function effectively in the presence of a deep water intake 96 in FIG. 11, conductive members 100, 101 are shown to extend very nearly to the bottom of the reservoir. In contrast, the distance h1 from the bottom edge of the conductive sheath 25A,B of FIG. 6, and the distance h1 from the bottom edge of conductive portion 102, 103 of FIG. 12 are significant distances from the reservoir bottom. According to the present invention, therefore, the depth D2 of the lower edge of conductive member is preferably determined by system requirements, and can extend to the bottom of a reservoir, or may terminate a predetermined distance, h1 above the reservoir bottom.

In a similar way, the water intake of FIG. 6 extends to the reservoir surface 61, and the depth D1 of the upper portion of the conductive member is effectively zero feet. In contrast, FIGS. 11 and 12 illustrate exemplary dams wherein the upper end of the conductive member is positioned a distance D1 far below the reservoir surface 61. Accordingly, the depths at which the upper and lower edges of a conductive member are positioned are determined by system requirements.

Figure 7:
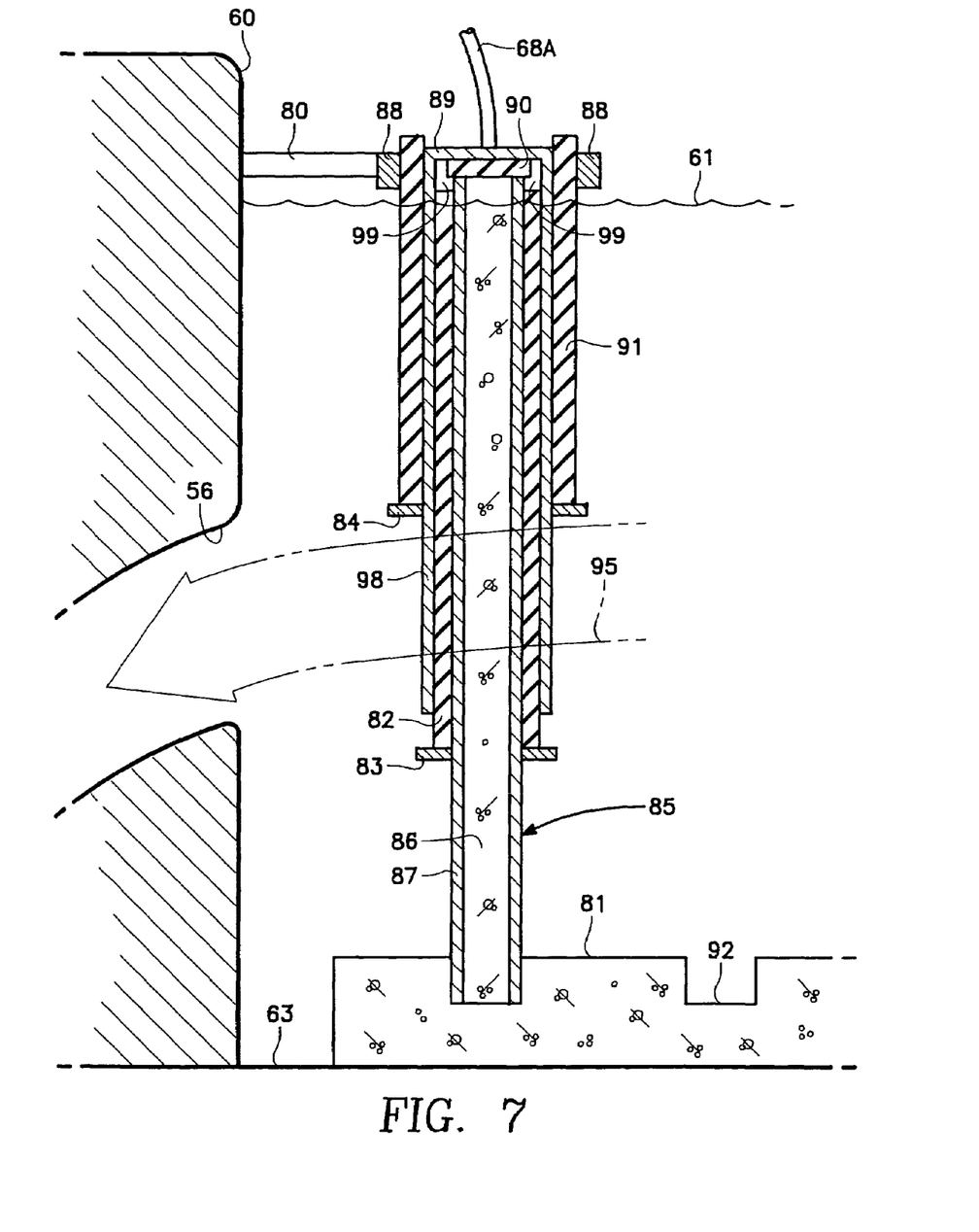
FIG. 7 is a cross-sectional side elevational view of an embodiment of a pile supporting a conductive member that is insulated from the pile.
Figure 8:
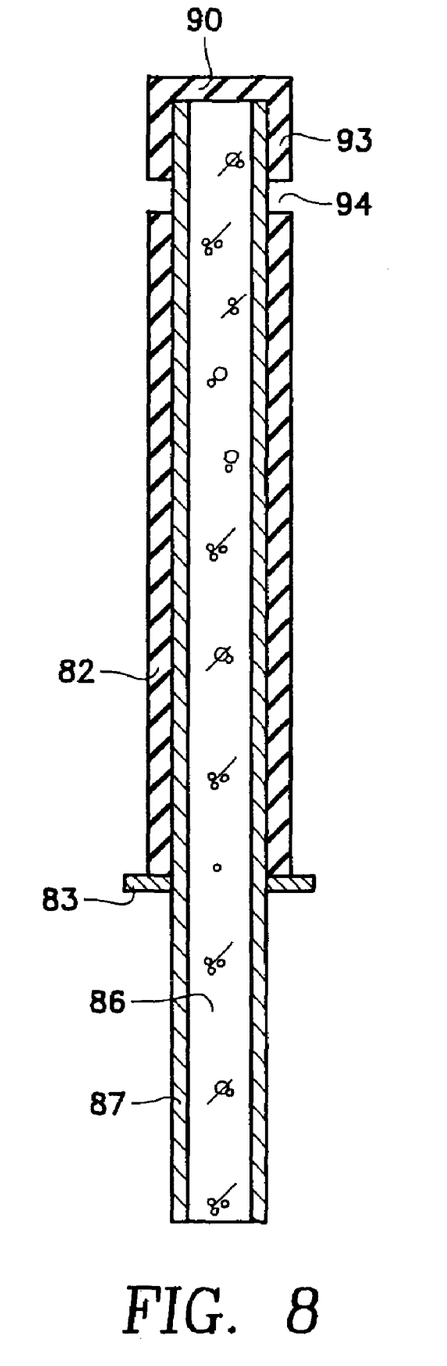
FIG. 8 is a cross-sectional side elevational view of an alternative embodiment of a pile supporting insulating skirt and sleeve.
Figure 9:
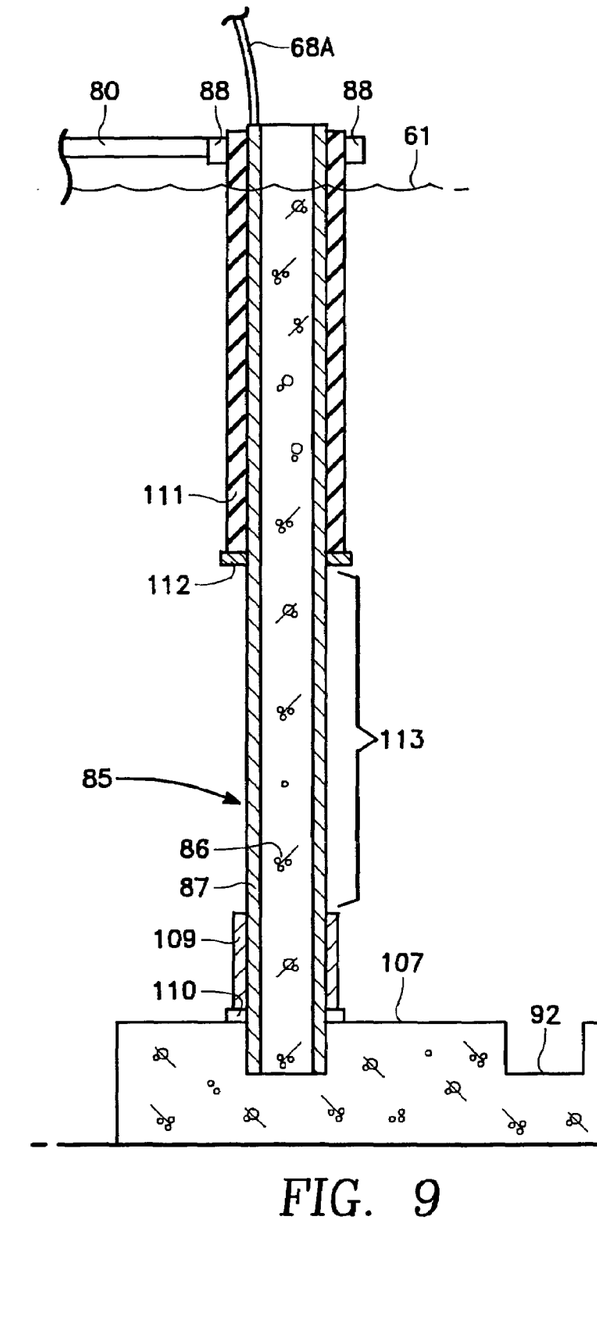
FIG. 9 is a cross-sectional side elevational view of a pile resting on an insulating concrete foundation and transmitting power to the electric fish barrier through a structural support pipe of the pile.

As illustrated in FIGS. 7–10, the conductive members 25A,B of FIG. 6 are variously formed from a conductive first sleeve 114 (FIG. 10), a lower portion of a conductive second sleeve 98 (FIG. 7), or from an exposed region 113 of the structural support pipe 87 forming the outer member of the pile 85 (FIG. 9). A benefit of first and second sleeves 98, 114 is that they are sacrificial, and can be replaced after galvanic erosion without having to replace the entire pile 85. An advantage of using an exposed region 113 of a structural support pipe 87, is the lower initial cost of installing the fish barrier. FIG. 7 illustrates second conductive sleeve 98 being suspended from the top of pile 85.

Referring to FIGS. 6 and 7, a pile 85 is advantageously formed from a structural support pipe 87 having opposing upper and lower ends and filled with concrete 86.

Although the diameter will depend on the application, the thickness of the support pipe 87 will be sufficient to contribute to the structural integrity of the pile 85. The inner diameter of the support pipe 87 will be great enough that, when filled with concrete, the pile 85 forms a sound structure suitable for the depth of the reservoir, the speed of the attraction flow impinging on the pile, and other variables. In embodiments wherein the structural support pipe 87 is not intended to function as a conductor, the pipe can have a protective coat such as epoxy or other insulating material. In embodiments wherein the structural support pipe 87 is used to conduct the electrical power creating the voltage gradient in the water, the protective coating is removed from surface areas from which electrical current originates.

The lower end of the concrete-filled pile 85 is embedded in a foundation 81 formed from concrete and disposed on the reservoir floor 63. The foundation 81 includes a plurality of recesses 92 for securing a respective plurality of support piles 85. The plurality of recesses 92 are oriented in an array according to the spacing to be exhibited by the arrays of electrode structures 58A–F, 59A–F. Although embodiments are envisioned wherein a separate foundation is used for each individual pile 85, according to the embodiment of FIGS. 6 & 7, a single concrete foundation 81 functions to support and secure the lower ends of all of the piles 85 from both arrays 58, 59 of electrodes. Because a pile 85 extends from the bottom 63 of a reservoir to the surface 61 of a reservoir, the height of a pile 85 will be greater in deep reservoirs than in shallow reservoirs. As a result, the weight imposed on each square inch of foundation 81 will also be greater in deeper reservoirs. The foundation should be thick enough to effectively support the weight of the pile 85 without cracking the foundation or displacing the foundation from a preselected area of the reservoir floor. The foundation can be pre-fabricated prior to placement on the floor of the reservoir.

Referring again to the embodiment of FIG. 7, the elongated conductive members 25A,B of FIG. 6 are formed from the exposed region of an electrically conductive sleeve 98 hanging from the top of the support pile 85. To prevent an electrical path from the conductive sleeve through the structural support pipe 87, the concrete foundation 81 and into the ground, the hanging conductive sleeve 98 is separated from the structural support pipe 87 by an inner insulating sleeve 82. The insulating sleeve is disposed between the conductive second sleeve 98 and the support pipe 87. An outer insulating sleeve 91 is then placed over the upper portion of the conductive sleeve 98 to selectively define an area of conductivity. Each of these components is discussed below in greater detail.

The inner insulating sleeve 82 of FIG. 7 can be formed from polyvinyl chloride (PVC) plastic pipe having a first end, a second end. The thickness of the insulating sleeve 82 will be sufficient to provide strength and durably commensurate with the height of the insulating sleeve 82. As understood from FIG. 7, the inner diameter of the inner insulating sleeve must be large enough to fit over the outer diameter of the structural pipe 87. The outer diameter of the inner insulating sleeve should be slightly smaller than the inner diameter of the second conductive sleeve 98, thereby allowing the second conductive sleeve 98 to slip over the inner insulating sleeve 82. The reference to PVC insulators is exemplary throughout this disclosure, and is not intended to preclude other insulating materials in any insulating member discussed herein. For example, depending on the acceptable parameters of a particular embodiment, the insulating qualities of the epoxy coating frequently used on underground steel pipes may be sufficient to reduce the electric current originating from epoxy coated surfaces to acceptable levels. The dimensions throughout this disclosure are also exemplary.

To support the inner insulating sleeve 82, a support flange 83 in the form of a metal ring is secured to the structural support pipe 87, preferably by welding. The outer diameter of a support flange 83 extends beyond the outer diameter of the inner insulating sleeve 82. As the inner insulating sleeve 82 slips over the pile 85, the support flange 83 and thereby limits the distance which the inner sleeve 82 can slide down the pile 85, and thereby defines the lower most position of the inner sleeve. Those skilled in the art will understand that embodiments utilizing an adhesion insulation, such as epoxy, will not require the same structural support as rigid insulative members, such as PVC piping. Accordingly, the structural support of insulating members described herein is also exemplary.

The conductive second sleeve 98 is lowered onto the support pile 85 after the inner insulative sleeve is in place, and is thereby separated from electrical continuity with the structural support pipe 87. The second conductive sleeve 98 can be formed from metal pipe, having a first end, a second end, and an inner diameter slightly greater than the outer diameter of the inner insulating sleeve 82. The length of the conductive sleeve 98 is selected according to the depth to which the conductive sleeve should extend into the reservoir. The position of the support flange 83 is lower than the lowest point of the conductive sleeve 98 when in place, or shorting will occur. The epoxy commonly used to coat steel pipe should not be present on that surface region of the conductive sleeve 98 that forms the elongated conductive portion 25A,B.

The top of the conductive second sleeve 98 is covered at its upper end with a metal-plate cap 89 securely welded to the top of the conductive sleeve 98. The cap and weld must be strong enough to support the weight of the conductive sleeve 98 as it hangs from the top of the pile 85 by the conductive cap 89. As the conductive sleeve 98 is slid down the pile 85 and the inner sleeve 82, the conductive sleeve 98 hangs on the top of the rigid pile 85 by the cap 89, thereby preventing the conductive sleeve 98 from sliding down beyond the predetermined depth.

Because direct contact between the conductive cap 89 and the top edge of the support pipe 87 of the rigid pile would create an electrical short through the foundation 81 to ground, an insulating cap 90 is disposed between the top of the pile 85 and the top of the conductive cap 89. For assembly purposes, the preferred embodiment envisions the insulating cap 90 to be in place prior to the insertion of the conductive sleeve 98 over the inner insulating sleeve 82. The insulating cap 90 can be incorporated into the structure in a variety of embodiments, as disclosed in FIGS. 7 and 8.

Because metal welds cannot be used to form a junction between the insulating cap 90 and inner insulating sleeve 82, the junction of the cap 90 and the insulating sleeve 82 is not likely to be strong enough to support the weight of the insulating sleeve in the same manner as the hanging conductive sleeve 98 discussed above. According to one embodiment, an insulating member 90, such as marine grade plywood or plastic, can be attached to the inside of the conductive cap 89 before the conductive cap is welded to the conductive sleeve 98.

As the conductive sleeve 98 is lowered in place, the insulating cap 90 will be compressed between the top of the pile 85 and the conductive cap, thereby preventing electrical contact. Because the heat of welding the conductive cap 89 to the second conductive sleeve 98 may produce sufficient heat to damage an insulative member secured to the inside surface of the conductive cap, the insulating cap 90 should not extend all the way to the edges of the conductive cap 89. This creates a small air gap 99 between the insulating cap 90 and the conductive sleeve 98. Similarly, the upper end of the inner insulating sleeve 82 preferably terminates below the top of the pile 85, thereby insuring that the weight of the conductive sleeve 98 is transmitted down the pile 85, and not down the insulating sleeve 82.

To avoid the possibility of heat damage to the insulating cap 90 during welding of the conductive cap 89, FIG. 8 illustrates an alternative embodiment. Instead of securing the insulating cap 90 to the inside of the conductive cap 89, FIG. 8 illustrates an upper cap 90 having a skirt 93 which is capable of securing to the top of a pile 85 while a conductive sleeve is lowered around it. To assemble an electrode member according to this embodiment, after the insulating sleeve 82 is lowered onto the pile 85, the insulating cap 90 is placed on top of the pile. To prevent the cap 90 from falling off, the insulating skirt 93 is glued or otherwise secured to the outer edge of the insulating cap 90. As the cap 90 is lowered onto the pile 85, the skirt 93 hangs from the cap 90, preventing it from falling off the top of the pile. To prevent the weight of the second conductive sleeve 98 from being transmitted down the insulating sleeve 82, the respective lengths of the insulating sleeve 82 and the skirt 93 should be spaced-apart a distance sufficient to accommodate construction variables. The resulting gap between the insulating skirt 93 and the insulating sleeve 82 can be large as long as it does not allow inadvertent contact between the structural pipe 87 of the support pile 85 and the second conductive sleeve 98.

Even ferrous metal experiences some galvanic erosion and must be replaced after time. A capped second conductive sleeve 98 according to FIG. 7 will always have a top portion extending above water. In this way, it will be easily accessible and allow replacement of the conductive sleeve without the need for divers to secure cables in a deep water environment.

Depending on the depth of a water inlet, an attraction flow may extend to very near the surface 61 of a reservoir, as illustrated in FIG. 6, or may have an upper limit far below the water surface, as illustrated in FIG. 7. To reduce the energy consumed by the fish barrier 62, it is desirable that the electrical current not extend unnecessarily above the upper limit of the attraction flow. To accomplish this, FIG. 7 shows an outer insulating sleeve 91 girded about the upper portion of the second conductive sleeve 98 thereby inhibiting substantial electrical current from passing directly from the upper portion of the sleeve 98 into the water.

The outer insulating sleeve 91 is a tubular structure with an upper end extending above the water line so that it can function to insulate the second conductive sleeve 98 from the steel collar 88, which, as discussed below, is used to brace the top of each electrode structure. To support the weight of the outer insulating sleeve 91, flanges 84 are attached to the conductive sleeve 87 at a predetermined depth. The outer insulating sleeve 91 can be uncapped. In embodiments wherein a voltage gradient is desired all the way to the surface 61 of the reservoir, the outer insulating sleeve 91 need only be a small insulating collar disposed within the steel collar 88 discussed below that secures the pile, thereby preventing an electrical short from the conductive sleeve 98 to the bracing structure 80.

An electrical cable 68A is electrically connected to establish electrical continuity between a terminal 66 of a voltage source 65 and the second conductive sleeve 98. The cable 68A is preferably made from copper wrapped in an insulating member. According to one embodiment, the cable 68A is connected to the conductive cap 89, eliminating the possibility of underwater galvanic activity by copper within the electrical cable 68A. An above-water connection serves both to preserve the cable from galvanic erosion, and to protect fish from potential copper sulfide poisoning. Additionally, connection, disconnection and replacement of an above-water cable 68A can be performed without divers.

FIG. 9 illustrates an alternative embodiment wherein an exposed portion 113 of a support pipe 87 functions as an elongated conductive member 25A,B of FIG. 6. A pile 85 is formed by a structural support pipe 87 filled with concrete 86 and as in the embodiment of FIGS. 7 and 8. The exposed portion 113 of support pipe 87 must be free of epoxy and other insulators since it must be able to conduct electrical current into the water.

Standard concrete in a water bed has a measurable electrical conductivity that can be significant in certain applications. In the embodiment of FIG. 7, the electrical conductivity of the foundational concrete is not important, since the structural support pipe 87 is not in electrical continuity with a power source. Because the support pipe of FIG. 7 is not energized, it will not transmit electrical current into the concrete foundation 81. However, the embodiment of FIG. 9 establishes a direct electrical path from the voltage source to the foundation. Consequently, the lower end of the support pile 85 is embedded in a foundation 107 of insulating concrete.

Insulating concrete is commercially available through various sources, such as Insulcrete™ by Smith-Root. The formulation of insulating concrete is commonly known to those skilled in the art, and can be formed by mixing standard cement and fine aggregate with effective amounts of fly ash and silica fume additives. Because commercially available mixtures of insulating concrete not only exhibit superior insulating qualities, but also exhibit superior strength, any embodiment disclosed herein can advantageously use insulating concrete foundations. In applications specifically requiring insulated concrete foundations, such as FIG. 9, reinforcing rods within the concrete will advantageously be formed from non-conducting members such as fiberglass rods or from epoxy covered steel rods, thereby maintaining insulative integrity throughout the foundation.

By utilizing insulative concrete for the foundation, the metal support pipe 87 forming the outer member of the pile 85 can be electrically coupled to the voltage source without experiencing excessive power loss through the foundation 107 and into the ground. This embodiment avoids the necessity of extending the metal sleeve 114 above the water surface 61 for power transmission, as shown in FIG. 7. It also avoids the need for overlapping insulative sleeves 91, 82, as required by the embodiment of FIG. 7.

With reference to FIG. 9, a lower insulative sleeve 109 has an inner diameter slightly larger than the outer diameter of the support pipe 87, thereby allowing it to easily slip onto the pile 85 during assembly. A lower foot 110 rests against the top surface of insulating foundation around the base of the pile 85. The lower insulative sleeve 109 is lowered onto the pile 85 until it comes to rest on the foot 110, thereby girding the lower exterior region of the pile 85.

A steel flange 112 in the form of a steel ring or collar is fixed to the structural support pipe 87 at a pre-determined location. An upper insulating sleeve 111 with an inner diameter slightly larger than the outer diameter of the support pipe 87, is lowered onto the pile 85 until it comes to rest on the steel flange 112. According to the embodiment of FIG. 9, conductive electrical cable 68A is in electrical continuity with the structural support pipe 87. The exposed region 113 of the support pipe 87 thus functions as the elongated conductive member 25 of the electrode. As discussed above, a highly resistive foundation 107 is utilized in conjunction with the embodiment of FIG. 9 to prevent the unnecessary consumption of electrical power by transmitting electrical current from the support pipe 87 into the ground.

Figure 10:
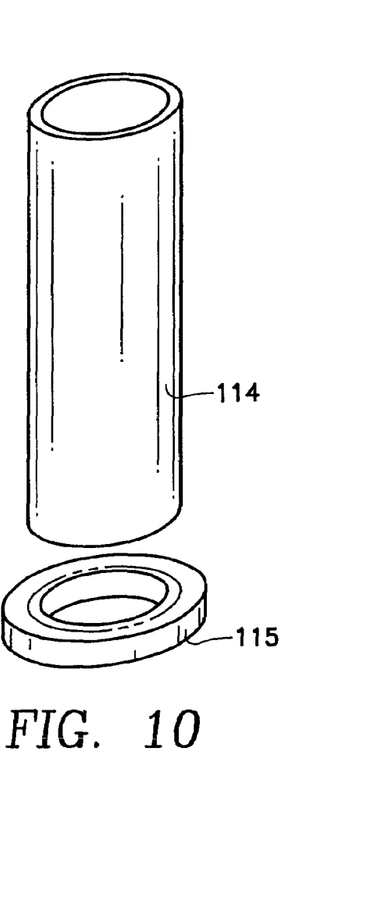
FIG. 10 is an isometric view of a flange and sacrificial sleeve supported by the pile of FIG. 9.

Although galvanic activity with ferrous metal is far less than with copper, electrical current passing from the exposed portion 113 of the support pipe 87 of FIG. 9 into the water will eventually erode the thickness of the support pipe. A hybrid embodiment is, therefore, envisioned utilizing the design of FIG. 9 in cooperation with a sacrificial first conductive sleeve 114, as illustrated in FIG. 10. A flange 115 is welded to the support pipe 87 at a predetermined location proximate the bottom of the exposed portion 113. The first conductive sleeve 114 is formed to have a length about equal to the longitudinal extent of exposed conductive portion 113. It is lowered onto the pile 85 and supported on the flange 115. Electrical welds are formed to ensure electrical continuity between the sleeve 114 and support pipe 87.

The use of a sacrificial first sleeve 114 reduces the galvanic erosion of the structural support pipe 87 of the pile 85, and can be replaced when the first sleeve 114 has become significantly eroded. However, the first sleeve 114 costs and weighs less than the full-length conductive sleeve 25 hanging from the top of the pile 85, as illustrated in FIG. 7. The embodiment of FIG. 9, with or without the sacrificial sleeve 114 of FIG. 10, further reduces the need for layered insulating caps 90 and overlapping insulating sleeves 82, 91 as illustrated in FIG. 7.

FIGS. 7–9 are directed to embodiments wherein piles are formed from concrete filled structural pipe enabling those skilled in the art to apply the claimed invention in the most structurally demanding environments. Depending on the depth of a reservoir, velocity of water flow, and other factors, the concrete fill within a structural pipe is optional. Moreover, embodiments are envisioned utilizing I-beams or solid steel rolls rather than hollow metal pipe. Finally, it is envisioned that wooden piles will offer sufficient height and strength in a variety of environments. As further noted, a conductive member can be supported by a tensile member such as a cable rather than a compressive member such as a pile. Accordingly, many specific details herein are exemplary of structures capable of enduring more demanding environments, and are not intended to limit the scope or interpretation of the claimed invention.

In its various embodiments, a unique feature of the invention is the ability to orient elongated conductive members 25A,B as shown in FIG. 6, of an electric fish barrier between a pre-determined upper and lower depth within a reservoir or body of water to prevent fish from swimming into a water intake. The depth range of the conductive member will advantageously be selected to span an area of sensible attraction flow leading to the water intake. The lower limit of a conductive member can be established either by limiting the depth to which a conductive sheath extends, or by or insulating the area of a conductive member that extends beneath the lowest depth required for an effective voltage gradient. Similarly, the upper limit of a conductive member can be established by limiting the vertical height of a sheath member, or by insulating the conductive member above a selected upper depth limit.

FIGS. 11 and 12 illustrate two similar dams with water intakes 96, 97 at different depths. As illustrated in these drawings, the vertical position of the conductive portions 100, 101, 102, 103 of the respective electrode members are adjusted to be about coextensive to the location of the intakes 96, 97.

Returning to FIGS. 7 and 9, each support pile 85 extends upward beyond the surface of the reservoir, where the upper end is restrained within a rigid collar 88 secured to a bracing structure 80, thereby bracing the electrode structures 58A–I, 59A–I in an upright position. The bracing structure 80 is preferably formed from a rigid network of steel beams, and is immovably secured to a reference object, such as a dam 60. An array of rigid collars 88 is secured to the bracing structure 80, in conformity with the array of corresponding electrode structures 58A–I, 59A–I, to be secured by the collars 88. The bracing structure thus provides support to the upper ends of the piles 85, thereby resisting the force of current, trash or even floating trees that might accumulate on the piles, and exert significant bending moment thereto. The collars can be formed of conducting or non-conducting material. If formed from conductive material, appropriate insulators must be used where required.

The bracing structure 80 described herein is one embodiment for structurally securing the electrodes, and should not be construed to prohibit other securing means which are envisioned within the scope of the present invention, including but not limited to cables or other tensile members, or to compressive braces affixed to the floor of the reservoir.

Although the preferred electrode structure described herein includes a rigid pile girded by a conductive sleeve, alternative electrode embodiments are envisioned within the scope of the invention. Tensile members can be substituted for the compressive piles. A horizontal or angular orientation of elongated electrode structures could be substituted in place of the vertically oriented elongated electrode structures described above. Accordingly, the vertical rigid-pile embodiment described herein is a detailed example of one particular embodiment, and should not be construed as limiting the present invention to a particular design, or to preclude the various alternative embodiments and equivalent structures envisioned within the scope of the invention.

The foregoing specification has been directed to an electric fish barrier configured to create a minimum voltage gradient within a predetermined range of depths within a reservoir. Two sets of electrodes forming the electric fish barrier comprise conductive elongated members supported within the predetermined range. The conductive elongated members are held in place by members that are inherently non-conductive, or that are insulated to prevent substantial electrical current from originating outside the predetermined range of depths. Each set preferably comprises a plurality of electrodes which are advantageously oriented to define a geometric surface such as a plane or curve, though other geometric structures are envisioned. The two geometric surfaces defined by the two sets of electrodes are preferably parallel to one another, and oriented perpendicular to the direction of attraction flow of water entering the intake. By utilizing an array of multiple electrodes electrically coupled to a first voltage terminal, and a complementary array of multiple electrodes electrically coupled to a second voltage terminal, the shape of the electric gradient can be extended, curved, or elongated to be effective across a variety of areas necessary to repel fish from entering the water intake and/or directing the fish to an alternative passage.

Within the foregoing description, many specific details commonly understood by those skilled in the art have not been recited so as to not needlessly obscure many of the essential features of the present invention. In other instances, some non-essential details have been described in conjunction with specific embodiments to better enable those skilled in the art to make and use the claimed invention. For example, the use of a rectangular pulsed DC signal at a two percent duty cycle and a specific voltage is exemplary. Depending on the application, other signal shapes, frequencies, duty cycles and voltages can be used. Component size, spacing, geometric orientation, and structural details are offered throughout for exemplary purposes, and are not intended to limit alternative embodiments and should not be construed as limiting the full range of applications. On the contrary, it will be readily apparent to one skilled in the art that the claimed invention may cover alternative structures, processes modifications and equivalents without departing from the spirit and scope of the foregoing description in view of the claims appended hereto.

What is claimed is:

1. An electronic barrier positioned in a body of water for governing the motion of fish in the water comprising:
   a first array of vertically-oriented, adjacent electrode structures;
   a second array of vertically-oriented, adjacent electrode structures, the second array spaced apart from first array; and,
   a voltage source for creating a voltage potential between the first array and the second array,
   wherein each electrode structure comprises
      a pipe having a top end and a bottom end;
      a first insulative sleeve surrounding at least a portion of the pipe adjacent the top end;
      a conductive sleeve surrounding a portion of the first insulative sleeve; and,
      a second insulative sleeve surrounding a portion of the conductive sleeve, the exposed portion of the conductive sleeve forming a conductive portion.

2. The electrode structure of claim 1 wherein the pipe is filled with concrete.

3. An electronic barrier for governing the motion of fish in a body of water, the body of water having water flowing into a water intake comprising:
   a first array of vertically-oriented, adjacent electrode structures, the first array positioned in front of the water intake;
   a second array of vertically-oriented, adjacent electrode structures, each of the electrode structures in second array having a second voltage, the second array positioned in front of the water intake, and spaced apart from first array, where each electrode structure includes a conductive portion and a first insulating portion selectively forming a voltage gradient in front of the water intake; and,
   a voltage source for creating a voltage potential between the first array and the second array.

4. The electronic barrier of claim 5 wherein each electrode structure includes a support portion.

5. The electronic barrier of claim 4 wherein the conductive portion surrounds at least part of the support portion.

6. The electronic barrier of claim 5 wherein:
   the conductive portion comprises a conductive sleeve;
   the support portion comprises a pipe;
   the first insulting portion comprises a first insulative sleeve surrounding the upper end portion of the conductive sleeve and surrounding an upper end portion of the pipe;
   further comprising a second insulative sleeve, spaced apart from the first insulative sleeve, the second insulative sleeve surrounded by a lower end portion of the conductive sleeve and surrounding a lower end portion of the pipe, the exposed portion of the conductive sleeve selectively forming the voltage gradient.

7. The electrode barrier of claim 6 wherein the pipe is filled with concrete.

8. The electronic barrier of claim 3 wherein the electrode structures in the first array define a first plane and the electrode structures in the second array define a second plane.

9. The electronic barrier of claim 8 wherein first and second planes are oriented perpendicularly to the flow of the water.

10. The electronic barrier of claim 9 wherein the first plane is spaced approximately six meters from the second plane.

11. A method for governing the motion of a fish in a body of water, the body of water having water flowing into a water intake comprising:
   generating a voltage gradient in the body of water by creating a first voltage potential in a first array of vertically-oriented, adjacent electrode structures, the first array positioned in front of the water intake and creating a second voltage potential, different than the first voltage potential, in a second array of vertically-oriented, adjacent electrode structures, the second array positioned in front of the water intake, and spaced apart from the first array, where each electrode structure includes a conductive portion and a first insulating portion selectively forming a voltage gradient in front of the water intake.

12. The method of claim 11 wherein a least a portion of the voltage gradient is contiguous around the first and second arrays.

* * * * *